United States Patent [19]

Abu-isa

[11] 3,867,477
[45] Feb. 18, 1975

[54] TWO-COMPONENT SYNERGISTIC ANTIOXIDANT SYSTEM FOR POLYOLEFINS

[75] Inventor: Ismat A. Abu-Isa, Birmingham, Mich.

[73] Assignee: General Motors Corporation, Detroit, Mich.

[22] Filed: Jan. 23, 1974

[21] Appl. No.: 435,720

[52] U.S. Cl..... 260/837 R, 260/42.28, 260/45.75 R

[51] Int. Cl............................................. C08g 45/04
[58] Field of Search....... 260/42.28, 45.75 R, 837 R

[56] References Cited
UNITED STATES PATENTS

| | | | |
|---|---|---|---|
| 2,467,550 | 4/1949 | Fletcher | 260/45.75 R |
| 2,480,008 | 8/1949 | Anderson | 260/41 R |
| 2,564,194 | 8/1951 | Johannes de Me | 260/45.8 A |
| 3,139,414 | 6/1964 | Ranalli | 260/837 R |

FOREIGN PATENTS OR APPLICATIONS 1,026,953  3/1958  Germany

Primary Examiner—James H. Derrington
Attorney, Agent, or Firm—George A. Grove

[57] ABSTRACT

An epoxide resin of the bisphenol-A type having the general formulawhere *n* is from 0 to 18
and litharge (PbO) when mixed together cooperate synergistically to provide a very effective antioxidant for some polyolefins and chlorinated polyolefin resins.

2 Claims, No Drawings

TWO-COMPONENT SYNERGISTIC ANTIOXIDANT SYSTEM FOR POLYOLEFINS

This invention relates to an antioxidant for polyolefins and chlorinated polyolefin resins. More specifically, it relates to the antioxidant synergistic effect produced by a suitable mixture of an epoxide resin of the bisphenol-A type described by the general formula-

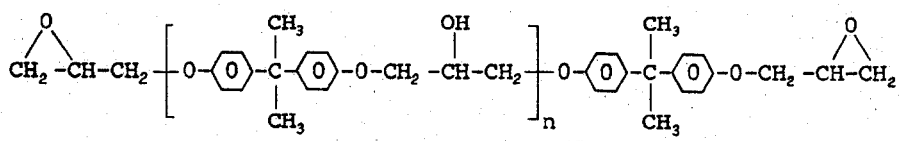

where $n$ is from 0 to 18 and litharge (PbO). The result is a remarkable increase in the oxidation resistance of the aforementioned polymers as reflected in both an increase in the induction time, during which little or no oxygen absorption by the resin occurs, and a decrease in the rate of oxygen absorption once the induction period has lapsed.

BACKGROUND OF THE INVENTION

Most organic polymers including the thermoplastic polyolefin polymers are susceptible to degradation reactions during aging. The most prevalent of these reactions is oxidation which may result in excessive crosslinking and embrittlement but it usually leads to chain scission which causes the material to soften and may literally destroy the resin's structural integrity. In either event, a degraded polymer is of little use, as it no longer has the engineering and decorative properties which made it particularly suited for a given application.

In the past, the oxidative degradation reaction has been slowed or delayed by the use of rather elaborate organic molecules such as the hindered phenols to neutralize the reactive oxygen radical by either a free radical or an ion exchange mechanism. These materials are conventionally used in concentrations of less than five percent and since they are not a part of the polymer matrix they may have a deleterious effect on the structural properties of the material. In addition, these antioxidants may be quite expensive since often times their molecular structure must be tailored to fit a given application.

It is an object of this invention to provide a novel antioxidant composition which has both improved effectiveness and lower cost for use in some polyolefin resins.

It is a further object to provide a novel synergistic antioxidant which utilizes the interaction and combined effect of an epoxide resin of the bisphenol-A type and lead oxide (PbO) to provide improved antioxidant protection for certain polyolefin materials.

SUMMARY OF THE INVENTION

In accordance with a preferred embodiment of my invention these and other objectives are accomplished by the addition of a two component antioxidant additive to a suitable polyolefin resin to a preferred concentration of about 9 percent by weight or within a suitable concentration range of from 2 percent by weight to 15 percent by weight of the resin. One component of this synergistic additive system is a bisphenol-A type epoxy resin with a general formula-

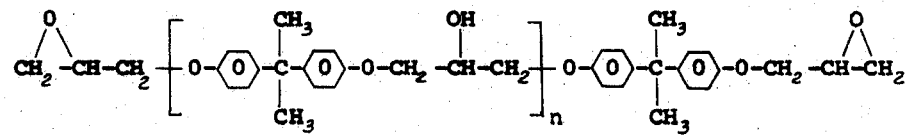

where $n$ has any value from 0 to about 18. The epoxide preferably constitutes about 45 percent of the total synergistic antioxidant additive mixture. However, the epoxide may be present within a suitable range of from about 35 percent by weight to about 50 percent by weight of the total of the two materials. The balance of the antioxidant system is litharge (PbO). This antioxidant mixture is preferably uniformly distributed throughout the resin in which it is employed.

I intend that this novel antioxidant mixture be used only in polyethylene, polypropylene, chlorinated polyethylene or mixtures thereof. As is known chlorinated polyethylene is a polymer having an aliphatic carbon backbone (like polyethylene) with chlorine atoms randomly replacing the hydrogen atoms along the chain.

The terms "antioxidant" and "stabilizer" have, in the past, been loosely used interchangeably, and therefore the features which distinguish these two functions have been obscured. More precisely, a stabilizer does not act to inhibit the initial reaction of the polymer molecule with a foreign substance, however, it does prevent the reaction product of that initial reaction from further degrading the polymer. For example, a stabilizer might not inhibit the dehydrochlorination of poly(vinyl chloride), however a stabilizer will inhibit the subsequent attack of the polymer by hydrogen chloride which is a product of the initial dehydrochlorination. Comparatively, an antioxidant, as the term suggests prevents an oxygen-containing active group from attacking the polymer in the first instance. Moreover, the term stabilizer commonly denotes materials which are used to protect monomers and prepolymers during storage prior to processing and the term antioxidant usually denotes materials used to protect finished polymer products. The system herein disclosed is properly termed an antioxidant as that accurately describes its function.

Table I illustrates a marked effect of the subject antioxidant in reducing the oxygen absorption of several polyolefin materials. In this Table the first column is the polymer being tested and the second column shows the induction period, during which there is little or no oxygen absorption. The third column lists the rate of oxygen absorption once the induction period has lapsed; the maximum absorption rate is reported and this usually occurs immediately after the induction period.

The absorption data are indicative of the rate of oxidative degradation since the oxidation reaction removes free oxygen from the polymer matrix and thereby creates a concentration gradient allowing the polymer to absorb oxygen from the surrounding atmosphere. The laws of diffusion require a concentration gradient for a mass transfer phenomenon, which in this case is absorption, to occur. Therefore, the rate of oxidative degradation is directly proportional to the rate of oxygen absorption. Accordingly, the longer the induction period and the lower the rate of oxygen absorption the more effective the antioxidant.

The specific antioxidant used in the polymeric resins listed in Table I was a mixture of 5 parts by weight litharge and 4 parts by weight of an epoxy having the general formula-

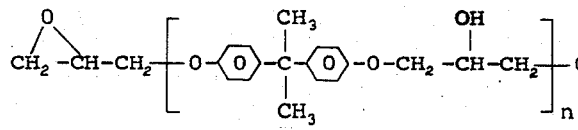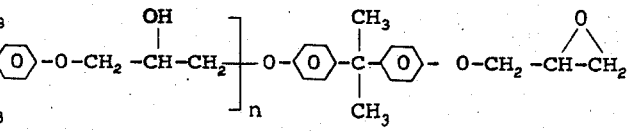

where $n$ was 0.15. Where used, the antioxidant mixture constituted about 9 percent by weight of the polymeric resin.

Table I shows that the addition of the subject antioxidant system at the preferred concentration of about 9 percent by weight reduces the rate of oxygen absorption and therefore the rate of oxidative degradation by at least one order of magnitude after the induction period had elapsed.

material were milled on a two roll mill to give the standard formulation the same mechanical and thermal history as the test samples. After the milling operation, thin slabs 1–1½ mils thick were molded from the polymer.

To prepare the test samples, 182 grams of chlorinated polyethylene were mixed with 8 grams of an epoxide resin having the formula-

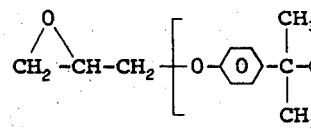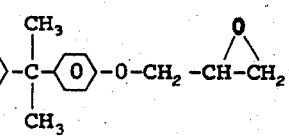

where $n = 0.15$ and 10 grams of litharge (PbO). This mixture was then milled and molded as described above.

The oxygen absorption of each polymer composition was measured using an all glass apparatus. Separate samples of each polymer compound were heated in the

TABLE I

The Effectiveness of the Subject Antioxidant in Various Polymers Which Were Aged in Pure Oxygen at Various Temperatures

| Polymer System | Aging Temperature °C. | Induction Period (Hours) | Rate of Post Induction Oxygen Absorption (Milliliters of Oxygen per Gram of Polymer per Hour) |
|---|---|---|---|
| 1. Chlorinated Polyethylene (CPE) | 150 | 0 | 29.0 |
|  | 165 | 0 | 39.1 |
| CPE + Antioxidant (9%) | 150 | 15 | 1.8 |
|  | 165 | 3 | 7.0 |
|  | 180 | 0 | 24.0 |
| 2. Polyethylene (P/E) | 150 | 0 | 51.0 |
| P/E + Antioxidant (9%) | 150 | 64 | 3.7 |
| 3. Polypropylene (P/P) | 150 | 0 | 563.0 |
| P/P + Antioxidant (9%) | 150 | 6 | 15.6 |

DETAILED DESCRIPTION OF THE INVENTION

In accordance with my invention, these and other advantages will be more apparent in view of the following detailed description including specific examples.

Although epoxy resins have been disclosed as antioxidants for some polymers, the examples discussed below will clearly demonstrate that the addition of the litharge at the preferred concentration greatly increases their effectiveness in the subject polyolefin compositions. These examples also show that litharge (PbO) alone is only slightly effective as an antioxidant and that there is more than the simple cumulative effect of these two ingredients when they are used together as an antioxidant system. This combined effect is properly termed synergism.

EXAMPLE 1

The Stabilization of Chlorinated Polyethylene

In this example, two formulations were compounded to test the effectiveness of the litharge-epoxy antioxidant mixture in a chlorinated polyethylene. The polymer containing no antioxidant was used as a standard and the same blending and testing procedures were followed with each formulation.

This standard formulation was a chlorinated polyethylene having no antioxidant additive. 200 grams of this closed apparatus at 150°C and 165°C using pure oxygen as the atmosphere. The induction periods of the two compositions along with the rates of oxygen absorption were measured by a technique which is fully described in the Journal of Polymer Science, Part A1, Vol. 8(4), p. 961, 1970, written by the inventor herein. This article is incorporated herein by reference; the data from this example are also tabulated in Table I.

The effectiveness of the antioxidant system at a concentration of 9 percent is clearly demonstrated by both the increase in the induction period and the dramatic reduction of the rate at which oxygen was absorbed by the material after the induction period has lapsed.

EXAMPLE 2

The Stabilization of Polyethylene

In this example, four polymer compositions were formulated using polyethylene as the base resin and then processed using the same antioxidant composition and testing procedures as described in Example 1, except that the oxidation evaluations were conducted at only one temperature—150°C. The first formulation served as a standard and was pure hi-density polyethylene having no antioxidant. The second formulation consisted of 192 grams of polyethylene and 8 grams of the epoxide resin which was used in Example 1. The third formulation consisted of 190 grams of the hi-density polyethylene and 10 grams of litharge (PbO). Finally, the fourth formulation consisted of 182 grams of hi-density polyethylene, 8 grams of the epoxide resin and 10 grams of litharge.

The oxygen absorption data on these four formulations are illustrated in Table II and they clearly demonstrate two important aspects of this invention. First, this data shows that the antioxidant system of this invention is effective in inhibiting the oxidation of polyethylene. Secondly, it is evident from this Table that this effect is not simply a cumulative effect of the two ingredients litharge and epoxide resins and, therefore, there is definitely a synergism acting in this system.

example, I tried tin oxide and antimony oxide because like lead oxide they both are bivalent. Then I tried acid acceptors such as dibutyltinmaleate and magnesium oxide because lead oxide is also an acid acceptor. Finally, I tried other random lead compounds such as lead acetate. These formulations were blended and compounded according to the procedures described in Example 1 and the oxygen absorption properties were also measured in accordance with that procedure. The test results of these various compounds are shown in Table III and unfortunately there was no clear indication of the possible chemical mechanism which may be operative in this system. In fact, none of the other com-

TABLE II

Degradation of Polyethylene Compounds at 150°C in Pure Oxygen

| Compound | Induction Period (Hours) | Rate of Oxygen Absorption (Milliliters of Oxygen per Gram of Polymer per Hour) |
|---|---|---|
| 1. Pure Polyethylene | 0 | 51.0 |
| 2. Polyethylene + 4% epoxide resin | 0 | 38.5 |
| 3. Polyethylene + 5% PbO | 6 | 13.8 |
| 4. Polyethylene + 5% PbO + 4% epoxide resin | 64 | 3.7 |

EXAMPLE 3

The Stabilization of Polypropylene

Using the procedures described in Example 1, samples of a pure polypropylene having no antioxidant and a polypropylene stabilized with the subject antioxidant pounds even approached the effectiveness of the system which is the subject of this invention, and there is no trend in the data to indicate a possible mechanism.

The percentage values in Table III by the respective additives are on a weight basis and based upon the weight of polypropylene.

TABLE III

The Effectiveness of Potential Antioxidant Systems in Polypropylene at 150°C. and Pure Oxygen

| Additive | Induction Period (Hours) | Rate of Oxygen Absorption (Milliliters of Oxygen per Gram of Polymer per Hour) |
|---|---|---|
| 1. (None) | 0. | 563 |
| 2. PbO(5%) + Ep* (4%) (i.e. SAS** 9%) | 6. | 15.6 |
| 3. PbO (5%) | 0.1 | 39 |
| 4. SnO (5%) + Ep (4%) | 0.2 | 140 |
| 5. SnO (5%) | 0. | 433 |
| 6. Lead Acetate (5%) + Ep (4%) | 0.5 | 56 |
| 7. Lead Acetate (5%) | 0. | 262 |
| 8. Dibutyltinmaleate (5%) + Ep (4%) | 0. | 395 |
| 9. Mg O (5%) + Ep (4%) | 0. | 395 |
| 10. $Sb_2O_3$ (5%) + Ep (4%) | 0. | 383 |

*EP is the subject epoxide resin
**SAS refers to subject antioxidant system system were prepared. The oxygen absorption tests were performed according to the same procedures that were described in Example 1, and the data is recorded in Table I. This novel antioxidant proved to be very effective in reducing the oxygen absorption and therefore the oxidative degradation of the polypropylene resin.

A series of experiments were run in an effort to define the mechanism by which the litharge and the epoxide resin combined to provide antioxidant protection to the polyolefin resins. To do this, I replaced the litharge with various compounds having similar properties. For While my invention has been described in terms of certain preferred embodiments, it will be appreciated that other forms thereof could be readily adapted by one skilled in the art. Therefore, the scope of my invention is not limited to the specific embodiments illustrated.

What is claimed is:

1. An oxidation resistant polyolefin composition comprising a polyolefin selected from the group consisting of polyethylene, polypropylene and chlorinated polyethylene, and two to fifteen percent by weight based on said polyolefin composition of an antioxidant, said antioxidant consisting essentially of, by weight, from about 35 percent to about 50 percent of an epoxide having the general formula-

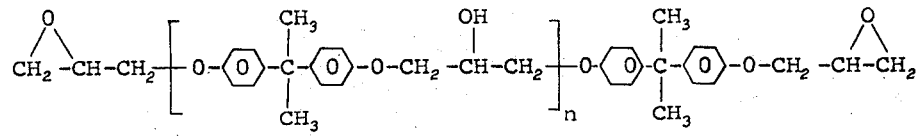

where *n* is from 0 to 18, and the balance litharge.

2. An oxidation resistant polyolefin composition comprising a polyolefin selected from the group consisting of polyethylene, polypropylene and chlorinated polyethylene, and two to fifteen percent by weight based on said polyolefin composition of an antioxidant, said antioxidant consisting essentially of, by weight, from about 35 percent to 50 percent of an epoxide having the general formula-

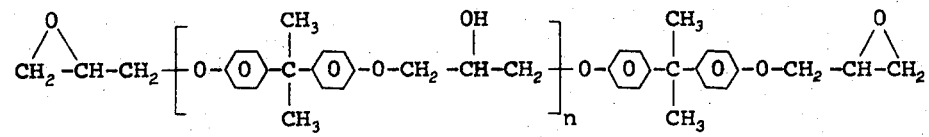

where *n* is from 0 to 1 and the balance litharge.

* * * * *